United States Patent [19]

Hanson et al.

[11] 4,164,054
[45] Aug. 14, 1979

[54] DIPSTICK WIPER

[76] Inventors: Cameron Hanson; Benjamin Dixon, both of Osceola, Wis. 54020

[21] Appl. No.: 818,454

[22] Filed: Jul. 25, 1977

[51] Int. Cl.² .................. G01F 15/12; G01F 23/04
[52] U.S. Cl. ................................................. 15/210 B
[58] Field of Search ............ 15/104.92, 210 A, 210 B, 15/218.1, 423; 33/126.7 R; D7/178

[56] References Cited

U.S. PATENT DOCUMENTS

| D. 108,234 | 2/1938 | Helsey | D7/178 |
| D. 195,116 | 4/1963 | Race | 15/210 B UX |
| 1,916,933 | 7/1933 | Peck | 15/210 B |
| 3,311,338 | 3/1967 | Culley | 248/205 A |
| 4,023,231 | 5/1977 | Haber | 15/210 B |

FOREIGN PATENT DOCUMENTS

| 502271 | 4/1929 | Fed. Rep. of Germany | 15/423 |
| 2015229 | 10/1971 | Fed. Rep. of Germany | 15/210 B |
| 1439144 | 4/1966 | France | 15/210 B |
| 338327 | 6/1959 | Switzerland | 15/210 B |

*Primary Examiner*—Daniel Blum

[57] ABSTRACT

A device for cleaning automotive dipsticks having a base for attachment of the device under a vehicle hood adhesively or magnetically provided with a block of porous absorbent material having a diagonally cut upwardly tapered surface. Means are optionally provided for compression of the block when the dipstick is inserted therein.

4 Claims, 2 Drawing Figures

U.S. Patent     Aug. 14, 1979     4,164,054

DIPSTICK WIPER

It is conventional in checking the oil or transmission fluid level in an engine crankcase or automatic transmission to wipe the dipstick gauge by means of a rag or paper towel so that the true reading will be obtained. On numerous occasions, however, the operator of a vehicle may desire to check the oil or transmission fluid level when no wiping device is conveniently available.

It has previously been proposed to attach a piece of felt near the engine for use in wiping of the dipstick. Such devices have met, however, with very limited use to date.

It is an object of the present invention to provide an improved device which can be conveniently mounted near a motor vehicle engine for use in wiping the oil dipstick. Another object of the invention is to provide such a device which can be conveniently mounted by means of its own adhesive means. A further object is to provide such a device which is provided with a rigid base member for contaning the oil wiping portion of the device. A further objective is to provide a device which can be conveniently used and which provides a maximum of wiping area and absorptive volume while still minimizing the amount of such material which must be used so that wiping block need be rinsed or replaced only once per six-twelve month period. A still further objective of the invention is to provide such a device which can conveniently be used as a promotional advertising means by small businesses.

Figure 1:
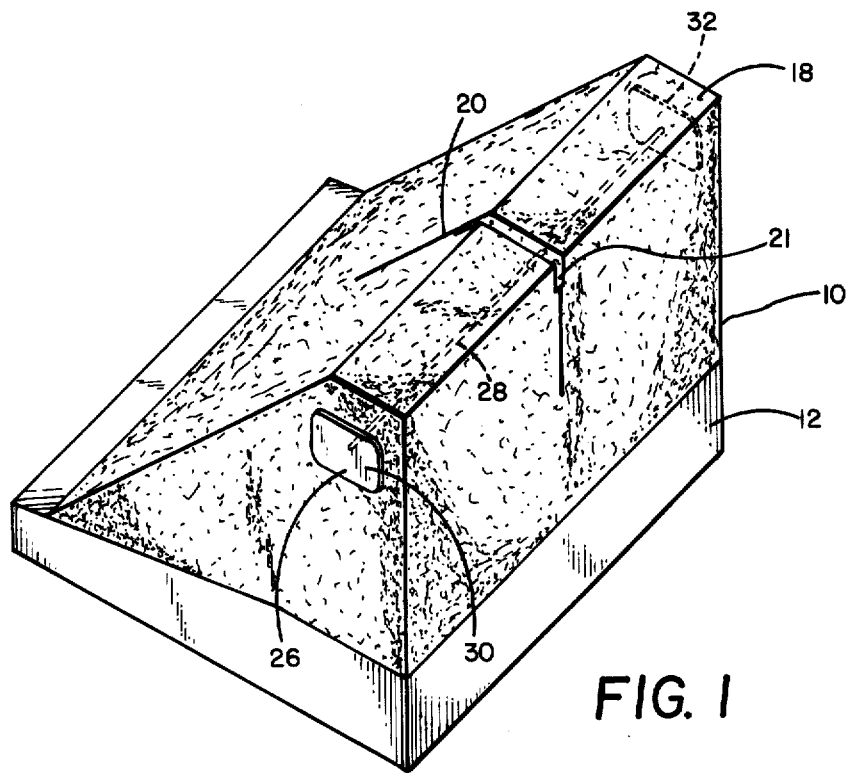
Figure 2:
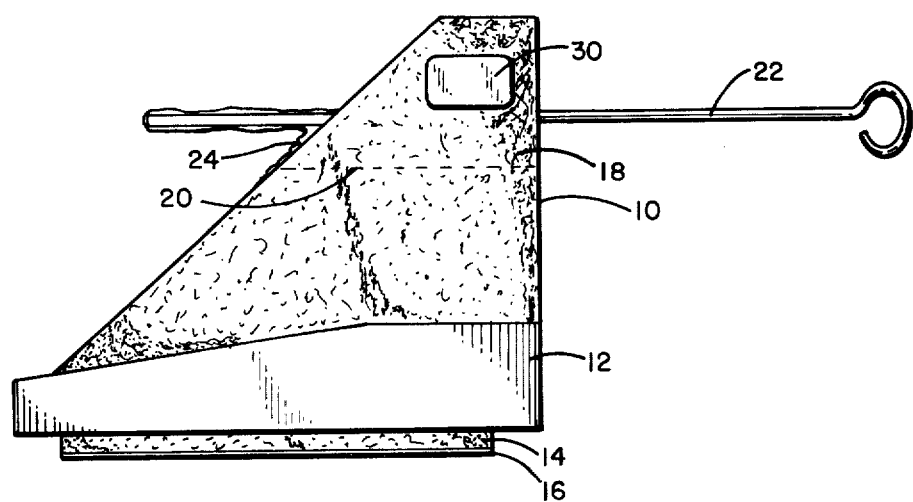

These and further objects and advantages of the invention will be further set forth with reference to the accompanying specification and drawings wherein:

FIG. 1 is a perspective view of a device according to the present invention, and FIG. 2 is an end view of a device according to the present invention.

According to this invention, an oil dipstick cleaner 10 is provided with a rigid base 12 which supports the same and forms a means for mounting the device near an engine. The bottom of base 12 is provided with means for affixing the device to a surface, preferrably an adhesive coated resilient foam material which readily conforms to an irregular surface for mounting the device. Other affixing means such as metal magnets or pliable magnetic material may be used instead. In the illustrated embodiment, liner 16 over a layer of adhesive coated resilient foam material 14 is removed in conventional fashion when the device is to be mounted.

Affixed to base 12 is a block of absorbent porous foam plastic 18 cut with an edge tapering toward the top. A slit 20 is provided in the central portion of block 18. The upper portion 21 of slit 20 is widened by cutting away of some of the material. This provides a visual aid for the user's convenience in locating the slot. In operation of the device, the oil dipstick 22 is wiped by drawing it through the slot 20 in the block 18. The oil indicated by numeral 24 is deposited on the sloping face of block 18.

It will be readily appreciated that the device can be mounted by means of adhesive coated foam material 14 under the hood of an automobile, preferrably to the interior fender or other suitable surface at a point convenient to the dipstick. In the event that the block 18 becomes accessively oily after months or years of usage it is possible to pull it loose from the base 20, wash it out with soapy water and allow to dry and readhere the same to base 20 for further use. The foam block is preferably spot guied inside the base to make removal easy and yet keep foam block from being thrown out of base by road or motor vibration.

A feature which is included in the invention is a means 26 for squeezing the sides of the block 18 together against the dipstick. A flat rigid plate 30 and 32 at each end of the block is interconnected by means of strand 28 which can be spring, fabric cord, polymeric plastic, monofilament or wire. When such device is provided, the downward pushing of dipstick 22 against strand 28 causes the ends of the block 18 to be pulled together by plates 30 and 32, thereby squeezing the sides of the slot 20 tightly against dipstick 22 and insuring the clean removal of the oil therefrom.

An alternative to the use of plates 30 and 32 is the use of a piece of wire having a loop on each end. A slit of suitable width to accommodate the wire can be provided so that the wire can be inserted therein and turned 90°. The loop at each end of the wire will then hold the sides of the block together and will compress the block when the center of the wire is depressed by pressing of the dipstick thereon.

In a further alternative, the pressure plates could be formed by extending the sides of base 12 upward along each side of the block and providing aligned slots in each. A wire looped on each end can then be inserted therein and turned 90° to act as a block compressing means.

The preferred absorbent polymeric material used in forming the absorbent block of the present invention is a flame retardant synthetic rubber type sponge material. Flame retardant flexible polyurethane foam material has been found to be ideal. In some cases, particularly, for use in connection with diesel trucks, for example, it is desirable to provide a longer device than shown in which two or more blocks of absorbent material may be provided. Such enlargement of the device is contemplated to be within the scope of the invention. While the device is excellent for use under the hood of an automobile it has also been found suitable for installation on the top of gas pumps at service stations for use by service station attendants. Other similar applications of the device will be readily apparent to those skilled in the art.

What is claimed is:

1. An oil dipstick wiper comprising in combination a box configurated housing, said housing including a bottom wall and opposite end and side walls and being open at the top a block of porous foam plastic, resilient material rising from the housing adhered to the inside thereof said clock being tapered towards its top, said block having a slot, said slot being transverse to and extending through the tapered portion of said block, means on the bottom of said housing for affixing the same to a surface and a compressing means being positioned adjacent each end of said block and generally parallel thereto, said compressing means being interconnected by an inelastic flexible strand which extends through said block and traverses said slot, whereby the block is compressed by depression of said means.

2. A device according to claim 1 wherein the top portion of said slot is widened and the lower portion is formed by a cut in said resilient foam material.

3. A device according to claim 1 wherein said strand is selected from the group consisting of string, fabric cord, polymeric monofilament or wire.

4. A device according to claim 1 wherein said affixing means is a layer of resilient foam material coated with adhesive.

* * * * *